(12) United States Patent
Ebberson

(10) Patent No.: US 11,490,611 B2
(45) Date of Patent: Nov. 8, 2022

(54) ROTATING FIN DEVICE FOR POWERLINE PRESERVATION

(71) Applicant: Jason Paul Ebberson, Seward, AK (US)

(72) Inventor: Jason Paul Ebberson, Seward, AK (US)

( * ) Notice: Subject to any disclaimer, the term of this patent is extended or adjusted under 35 U.S.C. 154(b) by 332 days.

(21) Appl. No.: 16/877,383

(22) Filed: May 18, 2020

(65) Prior Publication Data

US 2020/0275646 A1 Sep. 3, 2020

Related U.S. Application Data

(63) Continuation of application No. 15/404,710, filed on Jan. 12, 2017, now abandoned.

(60) Provisional application No. 62/279,135, filed on Jan. 15, 2016.

(51) Int. Cl.
*E04H 12/00* (2006.01)
*A01M 29/08* (2011.01)

(52) U.S. Cl.
CPC ............. *A01M 29/08* (2013.01); *E04H 12/00* (2013.01)

(58) Field of Classification Search
CPC ............................ A01M 29/08; A01M 29/06
See application file for complete search history.

(56) References Cited

U.S. PATENT DOCUMENTS

| 4,131,079 A | 12/1978 | Rousseau et al. |
| 6,557,482 B1 | 5/2003 | Doty et al. |

FOREIGN PATENT DOCUMENTS

| CN | 203827937 U | | 9/2014 | | |
| GB | 2526334 A | * | 11/2015 | ............ | A01M 29/06 |
| KR | 101649832 B1 | * | 8/2016 | ............ | E04H 12/00 |
| WO | WO-2011081491 A2 | * | 7/2011 | ............ | A01M 29/06 |

* cited by examiner

*Primary Examiner* — Magdalena Topolski
*Assistant Examiner* — Shanna Danielle Glover
(74) *Attorney, Agent, or Firm* — Christopher Mayle; Bold IP, PLLC

(57) ABSTRACT

The present invention features an elegantly-mounted pinwheel comprising alternating holographic red and silver non-metallic tape-like material. The pinwheel uses connector bolts and hexagonal coupling nuts to be mounted or positioned directly onto various components of a power pole or utility pole system such as bushings, fuse cutouts, regulators, reclosures, lightning arresters, or underground primary dips. The invention will deter animals such as birds and squirrels from scaling or landing on the power pole or utility pole system when the invention is properly mounted. The invention takes advantage of the alternating colors of the pinwheel to scare the animals. The present invention requires no housing, rotors, drums, or support plates. The invention does not rely on sound, and it requires no electricity or motor. The stainless steel hex standoff coupling nut comes preferably in ⅜" and can be ordered in different sizes to accommodate the device.

10 Claims, 4 Drawing Sheets

ROTATING FIN DEVICE FOR POWERLINE PRESERVATION

CROSS REFERENCE TO RELATED APPLICATION

This is a continuation of U.S. Non Provisional application Ser. No. 15/404,710 which claims priority to U.S. Provisional Application No. 62/279,135, filed Jan. 15, 2016, entitled "Device For Powerline Preservation", which is incorporated by reference.

FIELD OF THE DISCLOSURE

The overall field of the invention is animal scaring and repelling devices.

BACKGROUND

For a transformer bushing to work successfully over a period of years, its insulation material must remain effective in design, composition, and upkeep. Bushings sometimes fail and discharge due to the slow and progressive degradation of the insulation over years of energized service. When bushing contamination degrades the insulation, the voltage will conduct to the nearest earthed material. This process is called "tracking," and causes burning and arcing. Keeping bushings clean is therefore a key factor in their survival. At present, there is great interest by the electricity supply industry in monitoring the condition of high voltage bushings.

Birds and bird droppings are a significant degrader of bushings, and current bird scarers/repellers often cause as many problems than they ameliorate. Snap-on shed-style mount guards collect dirt and contaminate bushings. Bees also build hives in these shed-style mounts, which can lead to quicker destruction of the guards.

Some primitive animal repellants are rubber hose-type protective devices. These devices are easily moved out of place by weather, animals, or line repair workers. They also collect dirt and, when drenched with rain, create mud piles on top of the bushings.

The electricity supply industry has recognized the bird-deterring quality of flapping wing-type devices. For example, the invention of U.S. Pat. No. 6,557,482 has mounted fins which respond to wind currents by rotating. The invention of '482, however, requires a rotor and at least one separate support member. The invention of '482 also fails to utilize the scaring-effect of reflective, alternating colors. The invention of '482 also relies on sound.

The invention of U.S. Pat. No. 4,131,079 relies on a pair of large, thin, light weight, light-reflective discs to scare and repel animals. It is rotatably suspended from a remote end of a wire which is suspended from a vertically-extending post.

The invention of patent '079 structurally requires a post and wires. The invention of '079 does not utilize the scaring-effect of alternating colors, and its main scaring function is limited to the angles of light reflecting from its two circling reflective cups.

The invention of Chinese Patent CN20387937U uses flaps, but it comprises a central drum and support plates. In addition, '937 relies on sound as well as reflective light. Nor does the invention of '937 discuss detailed shapes of the pinwheel fins so as to capture maximal angles of visibility.

Other examples of wind-driven flapping devices include U.S. Pat. No. 4,597,357, U.S. Patent Application 2013/0014692A1, Chinese Patents CN203884532U CN203827937U, CN201178650Y, CN201256600Y, European Patent Publication WO1997011600A1 and a 2013 YouTube publication "How to make a bird scaring windmill from a plastic bottle!"

These inventions all either require fixed attachment means like posts or boxes, require support members, rotors, drums, plates or wires, rely on sound or require electronic prompts, use only one color or uni-directional fins, or they fail to alternate colors and angles of visibility.

For the foregoing reasons, there is a need for a reliable, durable, wind-powered device for powerline preservation made from sustainable material that is easy to service and maintain.

More Reference to, and discussion of, the foregoing background is not presented as prior art and is respectfully submitted that none of the above-indicated patents and patent applications disclose, teach, suggest, show, or otherwise render obvious, either singly or when considered in combination, the invention described and claimed herein.

SUMMARY

The present invention utilizes a reflective pinwheel, featuring red and silver alternating reflective colors. No device currently uses the advantages of the present invention: an elegantly-mounted pinwheel comprised of alternating holographic red and silver non-metallic tape-like material. The pinwheel is connected to one or more overhead power distribution transformer bushings, or to at least one fuse cut-out, using an industry standard hex coupling nut with internally-threaded ends. The bolt can be positioned directly onto the top of the bushing, onto fuse cut-outs or onto other strategic positions such as regulators, reclosures, lightning arresters, underground primary dips (potheads), and the pole itself. Any device mounted on a power pole assembly will accommodate the invention and scare birds away, making the birds land elsewhere. The invention takes advantage of the alternating colors of the pinwheel to scare the birds. The present invention requires no housing, rotors, drums, or support plates. The invention does not rely on sound, and it requires no electricity or motor. The stainless steel hex standoff coupling nut comes preferably in $\frac{3}{8}$" and can be ordered in different sizes to accommodate the pinwheel and the corresponding mounting locations on a power pole assembly.

In some embodiments, the preceding and following embodiments and descriptions are for illustrative purposes only and are not intended to limit the scope of this disclosure. Other aspects and advantages of this disclosure will become apparent from the following detailed description.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure. Also, the drawings included herein are considered by the applicant to be informal.

DEFINITIONS

Figure 2:
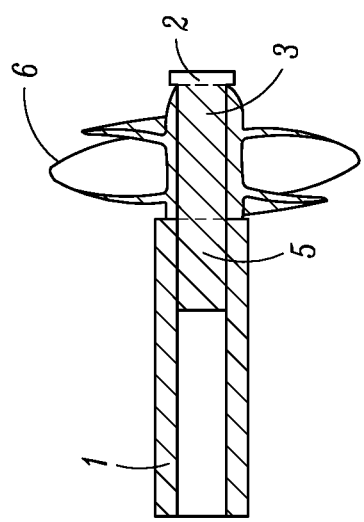
FIG. 2 is a side cross-sectional view of the invention.

Pinwheel: refers to an aerodynamic wheel attached at its axle to a base by a cylindrical pin or bolt. The wheel is designed to rotate when acted upon by a human, an animal such as birds and squirrels, or the atmosphere.

Holographic: refers to color using hologram technology involving reflective material capable of producing multiple colors at once from light reflection.

Axis: refers to an imaginary line about which a body or object rotates.

DETAILED DESCRIPTION

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm The preferred embodiment utilizes a reflective pinwheel, featuring a red or silver holographic color. The pinwheel may be connected to an overhead power distribution transformer bushing or to a fuse cut-out using an industry standard hex standoff bolt with threaded ends. The bolt may be positioned directly onto the top of the bushing, onto the fuse cutout or onto other strategic positions. The invention takes advantage of the alternating colors of the pinwheel to scare the birds, and requires no housing, rotors, drums, or support plates. Additionally, the invention does not rely on sound and it requires no electricity or motor.

The pinwheel itself is preferably made from recyclable or recycled material such as nylon, plastics, and metals including aluminum. The pinwheel also has a plurality of fins in the shape of loops, each with front and back faces with a holographic orchard-style reflective surface attached with contrasting colors such as red with white. The reflective surfaces are attached in alternating color sequence to the front and back faces of each fin such that each adjacent fin will be alternate, for example, red or silver holographic colors. The fins are formed around a metallic-reinforced ring and fan out in substantially the same way as the fins of a windmill. The center ring fits around the unthreaded collar section of a bolt (which is itself inserted into a hex bolt), which screws into the female threaded end of a male female hex coupling nut, which is attached to the top of a bushing. The pinwheel, therefore, freely spins around an axis in line with, for example, the unthreaded collar section of the bolt. The bolt and its hex head are fixed to a distribution transformer bushing or to a fuse cut-out.

An alternative embodiment features a pinwheel made from non-recyclable material including fiberglass, carbon fiber, metals, and certain plastics including polyethylene and polyvinyl chloride (PVC).

A second alternative embodiment features a coupling system that allows the present invention to be attached to different surfaces, buildings, and objects including street lights, eves of buildings, rooftops, traffic lights, traffic light posts, bridges, archways, fences, gates, farms, trees, bushes, swimming pools, and other surfaces. The pinwheel with this coupling system may be installed by hooks, clamps, screws, nails, adhesive material, and other coupling means common in the art.

A third alternative embodiment features non red and white alternating contrasting holographic color pairings such as black and silver or orange and blue.

A fourth alternative embodiment features additional friction-resistant parts such as bushings, washers, and grommets. The friction-resistance can be achieved from materials such as silicone or through coatings such as Teflon (a trademark of the Chemours Company FC, LLC).

A fifth alternative embodiment features a pinwheel with fins formed from actual loops rather than fins with solid front and back faces or surfaces. These skeletonized loop fins will maintain the same shape as the fins in the preferred embodiment but use less material. The reflective surfaces can still be attached along the surface of the loops and achieve the same effect.

Figure 1:
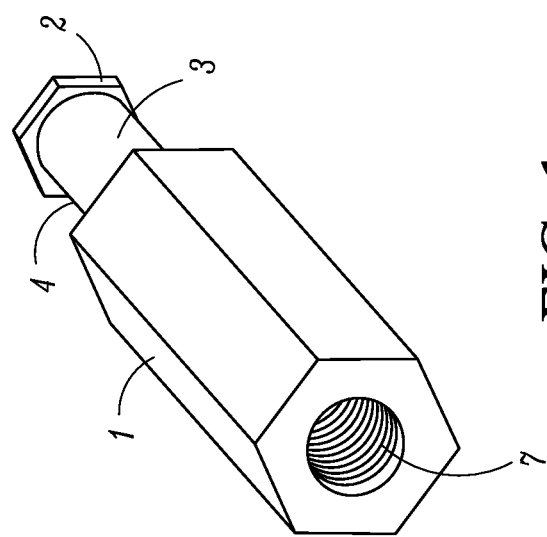
FIG. 1 is a rear perspective view of the invention showing the hexagonal coupling nut attached to the bolt.

FIG. 1 is an angular perspective view of the invention showing the partially threaded connector bolt 4 connected to the hexagonal (hex) coupling nut 1. In this view, the threaded internal center 7 is visible along with the non-threaded collar end 3 with raised collar 2 that forms a terminal barrier to prevent an attached or fitted pinwheel from sliding off. The pinwheel will freely spin on the corresponding axis formed by the partially threaded connector bolt 4 depending on the angular orientation of the bolt 4. For example, if the bolt 4 is tilted to a completely non-upright, horizontal position, the pinwheel would spin about the x-axis.

FIG. 2 is a side cross-sectional view of the invention and shows different components and how they are connected. First, the connector bolt 4 is passed through the center of the pinwheel 6 until the bolt's raised collar 2 meets the pinwheel 6 and the non-threaded portion 3 of the bolt 4 is fit within the center of the pinwheel 6 with minimal clearance. The minimal clearance allows the pinwheel 6 to freely rotate or spin about the non-threaded portion 3 and stay in place due to the collar 2 or raised end of the connector bolt 4 that forms a terminal barrier. The threaded portion of the connector bolt 4 is then screwed into the hexagonal coupling nut 1.

Figure 3:
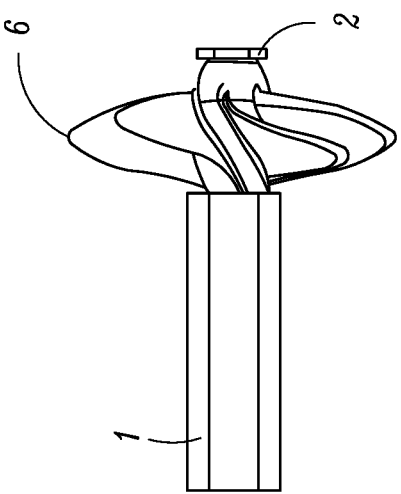
FIG. 3 is a side view of the invention.

FIG. 3 is a side view of the invention featuring the pinwheel 6 sitting between the collar 2 of the connector bolt 4 and the hexagonal coupling nut 1. This view provides a different perspective from FIG. 2.

Figure 4:
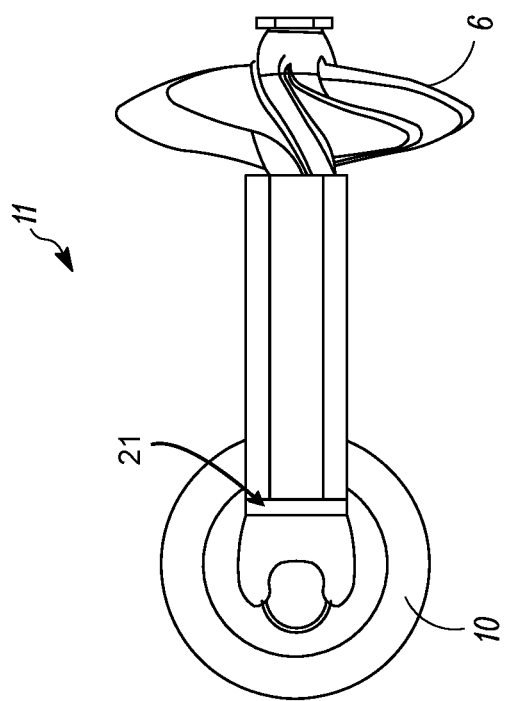
FIG. 4 is a top and side view of the invention installed on top of a transformer's porcelain bushing.

FIG. 4 shows a top view 11 of the invention mounted on top of a primary bushing 10 of a fuse cutout found on power pole assemblies. The hexagonal coupling nut 1 connected to the an aperture therethrough the top of the primary bushing 10 by a separate threaded connector bolt 21 that is screwed into threaded internal center 7 of hexagonal coupling nut 1. The pinwheel 6 is still located on the non-threaded collar end 3 of the partially threaded connector bolt 4 (as shown in FIG. 2) and can free spin around the non-threaded end via wind.

Figure 5:
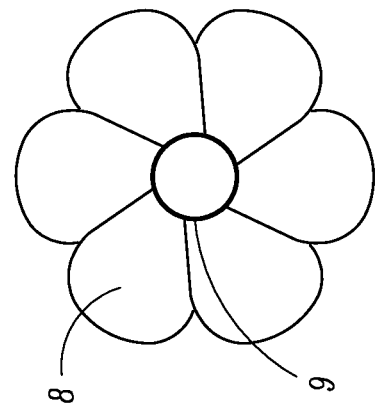
FIG. 5 is a front view of the pinwheel.

FIG. 5 is a front view of the pinwheel showing a plurality of fins 8 with the metallic reinforced ring 9. The pinwheel's fins 8 are loops that fan out as blades like those of a windmill, and said fins 8 are angled in a uniform direction to allow rotational movement in both clockwise and counter-clockwise directions, depending on the direction of the wind. The fins 8 are joined together at the center where the metallic reinforced ring 9 is located.

Figure 6:
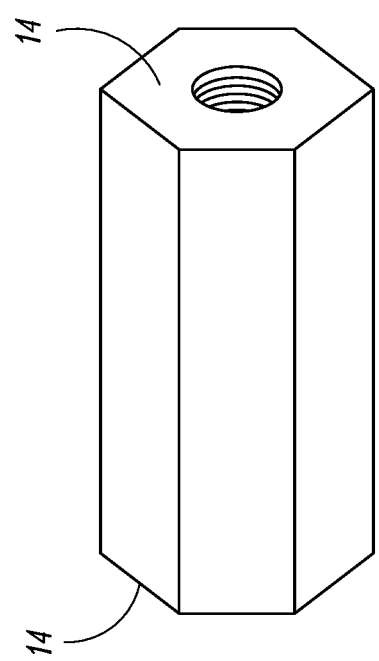
FIG. 6 is a side perspective view of the hexagonal coupling nut.

FIG. 6 is a side perspective view of the hexagonal coupling nut 1. The nut a hollow, threaded core to receive the threaded portion of a reciprocal connector bolt at either end, such as the partially threaded connector bolt 4 mentioned above. The nut has flat sides 14 at both ends because the nut is symmetrical. When the nut 1 and the pinwheel 6 are both connected to the partially threaded connector bolt 4 in the proper configuration, the pinwheel 6 will be wedged between the collar 2 of the partially threaded connector bolt 4 and the flat side 14 of one end of the hexagonal coupling nut 1 with minimum clearance. This, along with the non-threaded surface of the non-threaded side of the partially threaded connector bolt will allow the pinwheel to freely spin in place.

Figure 7:
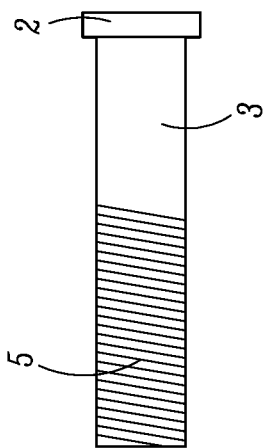
FIG. 7 is a side view of the invention's partially-threaded connector bolt.

FIG. 7 is a side view of the partially threaded connector bolt 4. The bolt has a threaded end 5 and a non-threaded collar end 3 that has a collar or raised lip 2 that acts as a terminal barrier. The collar 2 makes contact with the side walls of the metallic reinforced center ring at the center of the pinwheel 6 when the partially threaded connector bolt 4 is passed through the pinwheel 6.

Figure 8:
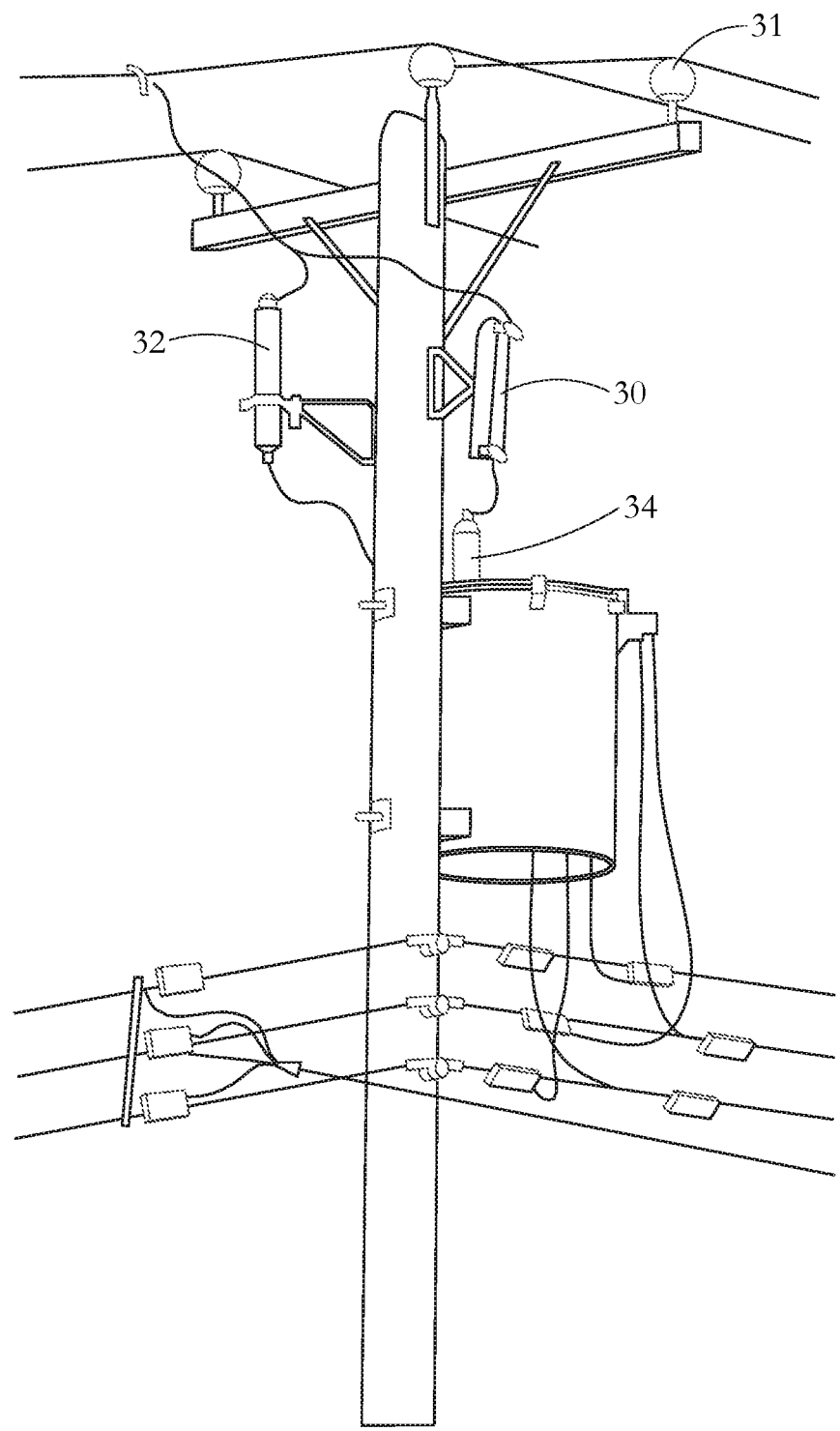
FIG. 8 is a side landscape view of a power line or utility pole system.

FIG. 8 is a side landscape view of a power line or utility pole system. FIG. 8 diagrams this system to show the location of a primary bushing that the present invention would be mounted on. As shown in FIG. 8, the system includes a bushing 34 as well as lightning arrestors 30 and 32, as well as an insulator 31.

While preferred and alternate embodiments have been illustrated and described, as noted above, many changes can be made without departing from the spirit and scope of this DEVICE FOR POWERLINE PRESERVATION. Accordingly, the scope of the DEVICE FOR POWERLINE PRESERVATION is not limited by the disclosure of these preferred and alternate embodiments. Instead, the scope of the DEVICE FOR POWERLINE PRESERVATION is to be determined entirely by reference to the claims. Insofar as the description above and the accompanying drawings (if any) disclose any additional subject matter that is not within the scope of the claims below, the inventions are not dedicated to the public and Applicant hereby reserves the right to file one or more applications to claim such additional inventions.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

Any element in a claim that does not explicitly state "means for" performing a specified function, or "step for" performing a specific function is not to be interpreted as a "means" or "step" clause as specified in 35. U.S.C. § 112 ¶6. In particular, the use of "step of" in the claims herein is not intended to invoke the provisions of U.S.C. § 112 ¶6.

The invention claimed is:

1. A method utilizing a device for deterring animals, the method comprising:
   directly connecting an integral connector bolt to a pinwheel, the pinwheel comprising a plurality of fins and a reinforcement ring, the reinforcement ring centrally attached to the plurality of fins to form a fanned out, aerodynamic pinwheel shape that allows the pinwheel to spin freely in wind about an axis in either direction, each fin of said plurality of fins further comprising:
      solid front and back faces having reflective surfaces;
         wherein the integral connector bolt comprising a threaded end and a non-threaded collar end, said non-threaded collar end further comprising:
   a raised collar that forms a terminal barrier at the non-threaded collar end to prevent the pinwheel from sliding off the non-threaded collar end, the integral connector bolt passing through the reinforcement ring to allow rotation around the integral connector bolt and prevent sliding off the non-threaded collar end due to the raised collar that forms the terminal barrier;
   directly connecting a hexagonal coupling nut to the threaded end of the integral connector bolt such that an endpoint of the threaded end is positioned inside of the hexagonal coupling nut;
   the hexagonal coupling nut having an internally threaded center with a flat first female end and a flat second female end; and directly connecting the hexagonal coupling nut to a top of a primary bushing of a powerline or utility pole system by a separate threaded connector bolt.

2. The method of claim 1, reflecting red and white holographic colors on the reflective surfaces in an alternating holographic color sequence whereby each fin of said plurality of fins has an individual reflective surface with a holographic color that contrasts with the color of an adjacent fin.

3. The method of claim 2, the pinwheel further comprising recycled or recyclable metal.

4. The method of claim 2, the pinwheel further comprising recycled or recyclable nylon or recycled or recyclable plastic.

5. The method of claim 2 further comprising:
applying a friction-resistant coating in and around the center ring, the non-threaded collar end of the connector bolt, and the raised collar of the non-threaded collar end of the connector bolt such that the device can spin freely in the wind with minimal friction.

6. The method of claim 2, the pinwheel further comprising fiberglass, or carbon fiber, or PVC.

7. A method utilizing a device for deterring animals, the method comprising:
directly connecting an integral connector bolt to a pinwheel, the pinwheel comprising a plurality of fins and a reinforcement ring, the reinforcement ring centrally attached to the plurality of fins to form a fanned out, aerodynamic pinwheel shape that allows the pinwheel to spin freely in wind about an axis in either direction, each fin of said plurality of fins further comprising:
front and back faces having reflective surfaces; wherein the integral connector bolt having a non-threaded collar end further comprising:
a raised collar that forms a terminal barrier at the non-threaded collar end to prevent the pinwheel from sliding off the non-threaded collar end, the integral connector bolt passing through the reinforcement ring to allow rotation around the integral connector bolt and prevent sliding off the non-threaded collar end due to the raised collar that forms the terminal barrier;
directly connecting a hexagonal coupling nut to threaded end of the integral connector bolt such that the integral connector bolt terminates inside of the hexagonal coupling nut; and directly connecting the hexagonal coupling nut to a top of a primary bushing by a separate threaded connector bolt.

8. The method of claim 7, reflecting red and white holographic colors on the reflective surfaces in an alternating holographic color sequence whereby each fin of said plurality of fins has an individual reflective surface with a holographic color that contrasts with the color of an adjacent fin.

9. The method of claim 8, the pinwheel further comprising recycled or recyclable metal.

10. The method of claim 8, the pinwheel further comprising recycled or recyclable nylon or recycled or recyclable plastic.

* * * * *